United States Patent
Yan et al.

(10) Patent No.: US 7,551,676 B1
(45) Date of Patent: Jun. 23, 2009

(54) TECHNIQUE FOR REDUCING PEAK-TO-AVERAGE POWER RATIO IN DIGITAL SIGNAL COMMUNICATIONS

(75) Inventors: Mingjian Yan, Potomac, MD (US); Aleksandar Purkovic, Potomac, MD (US)

(73) Assignee: Nortel Networks Limited, St. Laurent, Ontario (CA)

( * ) Notice: Subject to any disclaimer, the term of this patent is extended or adjusted under 35 U.S.C. 154(b) by 1334 days.

(21) Appl. No.: 10/443,009

(22) Filed: May 22, 2003

(51) Int. Cl.
   *H04L 27/28* (2006.01)
(52) U.S. Cl. .................. 375/260; 375/295; 375/296; 370/208
(58) Field of Classification Search ............... 375/260, 375/141, 295, 296; 370/208
   See application file for complete search history.

(56) References Cited

U.S. PATENT DOCUMENTS

| | | | |
|---|---|---|---|
| 3,747,003 A * | 7/1973 | Siglow .................. 329/310 |
| 5,841,813 A | 11/1998 | Van Nee | |
| 6,005,840 A | 12/1999 | Awater et al. | |
| 6,125,103 A | 9/2000 | Bäuml et al. | |
| 6,175,551 B1 | 1/2001 | Awater et al. | |
| 6,301,268 B1 | 10/2001 | Laroia et al. | |
| 6,307,892 B1 | 10/2001 | Jones et al. | |
| 6,314,146 B1 | 11/2001 | Tellado et al. | |
| 6,424,681 B1 | 7/2002 | Tellado et al. | |
| 6,512,797 B1 | 1/2003 | Tellado et al. | |
| 6,556,557 B1 * | 4/2003 | Cimini et al. ............... 370/342 |

OTHER PUBLICATIONS

A.D.S. Jayalath and C. Tellambura "Adaptive PTS Approach For Reduction of Peak-to-Average Power Ratio of OFDM Signal," *Electronic Letters* Jul. 6, 2000 vol. 36 No. 14, pp. 1226-1228.
Leonard J. Cimini, Jr. and Nelson R. Sollenberger, "Peak-to-Average Power Ratio Reduction of an OFDM Signal Using Partial Transmit Sequences," *IEEE Communication Letters*, vol. 4, No. 3, Mar. 2000, pp. 86-88.
S.H. Müller and J.B. Huber, "OFDM With Reduced Peak-to-Average Power Ratio by Optimum Combination of Partial Transmit Sequences," *Electronics Letters* Feb. 27, 1997, vol. 33 No. 5, pp. 368-369.
Hong Chen and Gregory J. Pottie, "An Orthogonal Projection-Based Approach for PAR Reduction in OFDM," *IEEE Communications Letters*, vol. 6, No. 5, May 2002, pp. 169-171.

* cited by examiner

*Primary Examiner*—David C Payne
*Assistant Examiner*—Leila Malek
(74) *Attorney, Agent, or Firm*—Hunton & Williams LLP

(57) ABSTRACT

A technique for reducing peak-to-average power ratio (PAPR) in digital signal communications is disclosed. In one particular exemplary embodiment, the technique may be realized by a method comprising the steps of modulating a frequency-domain input vector comprising a plurality of path vectors by applying a Gray code sequence of combinations of binary phase rotations to the plurality of path vectors, where, in each combination, the binary phase rotation of only one of the plurality of path vectors is changed from a previous combination in the Gray code sequence; and determining an optimal time-domain peak value based on the modulated frequency-domain input vector.

12 Claims, 2 Drawing Sheets

TECHNIQUE FOR REDUCING PEAK-TO-AVERAGE POWER RATIO IN DIGITAL SIGNAL COMMUNICATIONS

FIELD OF THE INVENTION

The present invention relates generally to communication systems and, more particularly, to a technique for reducing peak-to-average power ratio (PAPR) in digital signal communications.

BACKGROUND OF THE INVENTION

In today's information age, communication systems carry voice, fax, data, video, and other information over a variety of communication media using a variety of technologies. To achieve increased bandwidth combined with two-way communications, a number of multi-carrier transmission schemes have been proposed for many different types of communication systems, including Digital Audio Broadcasting (DAB) and broadband Wireless Local Area Networks (WLANs). Of these multi-carrier schemes, orthogonal frequency-division multiplexing (OFDM) is most attractive for high-bit-rate transmission. By dividing the total bandwidth into many narrow sub-channels (sub-carriers), the effects of multi-path delay spread can be minimized.

However, one of the limitations to using OFDM is the high peak-to-average power ratio (PAPR) of the transmitted signal and the increase of PAPR with increased number of sub-channels. The high PAPR signal may be clipped when passed through a transmitter-side power amplifier, causing in-band distortion and out-of band radiation. Therefore, a PAPR reduction algorithm is needed at the transmitter to reduce the undesired effects of the power amplifier.

A promising approach, called partial transmit sequences (PTS) scheme, has been introduced to reduce the high PAPR in the transmission of OFDM signals. In an original PTS scheme, the input OFDM data block is partitioned into disjoint sub-blocks or clusters which are subsequently combined with weighted factors to minimize the overall PAPR.

For example, let the input data block be a vector $X=[X_1\ X_2\ \ldots\ X_N]$ and turn the data block X into M disjoint sub-blocks, represented by the vectors $V_m$ (wherein $m=1, 2, \ldots, M$), such that $$X = \sum_{m=1}^{M} V_m.$$

The objective is to optimally combine the M sub-blocks $$X' = \sum_{m=1}^{M} b_m V_m,$$

blocks where $b_m$ (wherein $m=1, 2, \ldots, M$) are weighting factors and are assumed to be pure phase rotations. In the time domain, $$x' = \sum_{m=1}^{M} b_m v_m,$$

where $v_m$, the inverse discrete Fourier transform (IDFT) of $V_m$, is called the partial transmit sequence. The weighting factors (phase factors) are chosen to minimize the PAPR of x'. It has been shown that in PTS algorithms, a set of two phase rotations, e.g., 0 and $\pi$, are sufficient to acquire most of reduction. Therefore, considering binary choices for each $b_m$, there are $U=2^M$ number of different possible combinations (transformation paths) for the M sub-blocks. Theoretically, there exist $2^{M-1}$ possible peak values as a result of the modulations, since half of the $U=2^M$ modulated signals will have the same peak value but opposite phase angles as the other half of the modulated signals. A search has to exhaust these $2^{M-1}$ transformation paths in order to achieve the optimal PAPR, $$PAPR_{opt} = \min_{b_1 \ldots b_M} \left( \left\| \sum_{m=1}^{M} b_m v_m \right\|_\infty \right)$$

where an optimal set of $b_m$ (wherein $m=1, 2, \ldots, M$) is determined, coded into an M-bit number (path number), and transmitted with the information bits to the receiver.

Although this method results in significant improvement at low redundancy, without introducing much distortion, it requires exhaustive search in the parameter space for achieving the best performance. To overcome the inherent complexity of this scheme, a number of methods have been proposed for practical implementations. Yet none of them achieves a lower complexity without sacrificing optimal performance of the PTS scheme.

In view of the foregoing, it would be desirable to provide a practical PAPR reduction solution which overcomes the above-described inadequacies and shortcomings. More particularly, it would be desirable to provide a technique for optimized PAPR reduction in a multi-carrier transmission system in an efficient and cost effective manner.

SUMMARY OF THE INVENTION

According to the present invention, a technique for reducing peak-to-average power ratio (PAPR) in digital signal communications is provided. In one particular exemplary embodiment, the technique may be realized by a method comprising the steps of modulating a frequency-domain input vector comprising a plurality of path vectors by applying a Gray code sequence of combinations of binary phase rotations to the plurality of path vectors, where, in each combination, the binary phase rotation of only one of the plurality of path vectors is changed from a previous combination in the Gray code sequence; and determining an optimal time-domain peak value based on the modulated frequency-domain input vector.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings.

These drawings should not be construed as limiting the present invention, but are intended to be exemplary only.

DETAILED DESCRIPTION OF EXEMPLARY EMBODIMENT(S)

In general, the present invention teaches a method of utilizing a Gray code sequence in the search of minimum peak values among modulated transmission signals. A Gray code is a way of encoding binary numbers so that only one digit changes from one number to the next. That means a single 0 can change to a 1, or a single 1 can change to a zero. In the present invention, when a combination of binary phase rotations are applied to the sub-blocks of an input signal vector, a search for peak values is conducted by alternating the phase rotation of one sub-block at a time. This method is described in more detail in the following exemplary embodiments.

Figure 1:
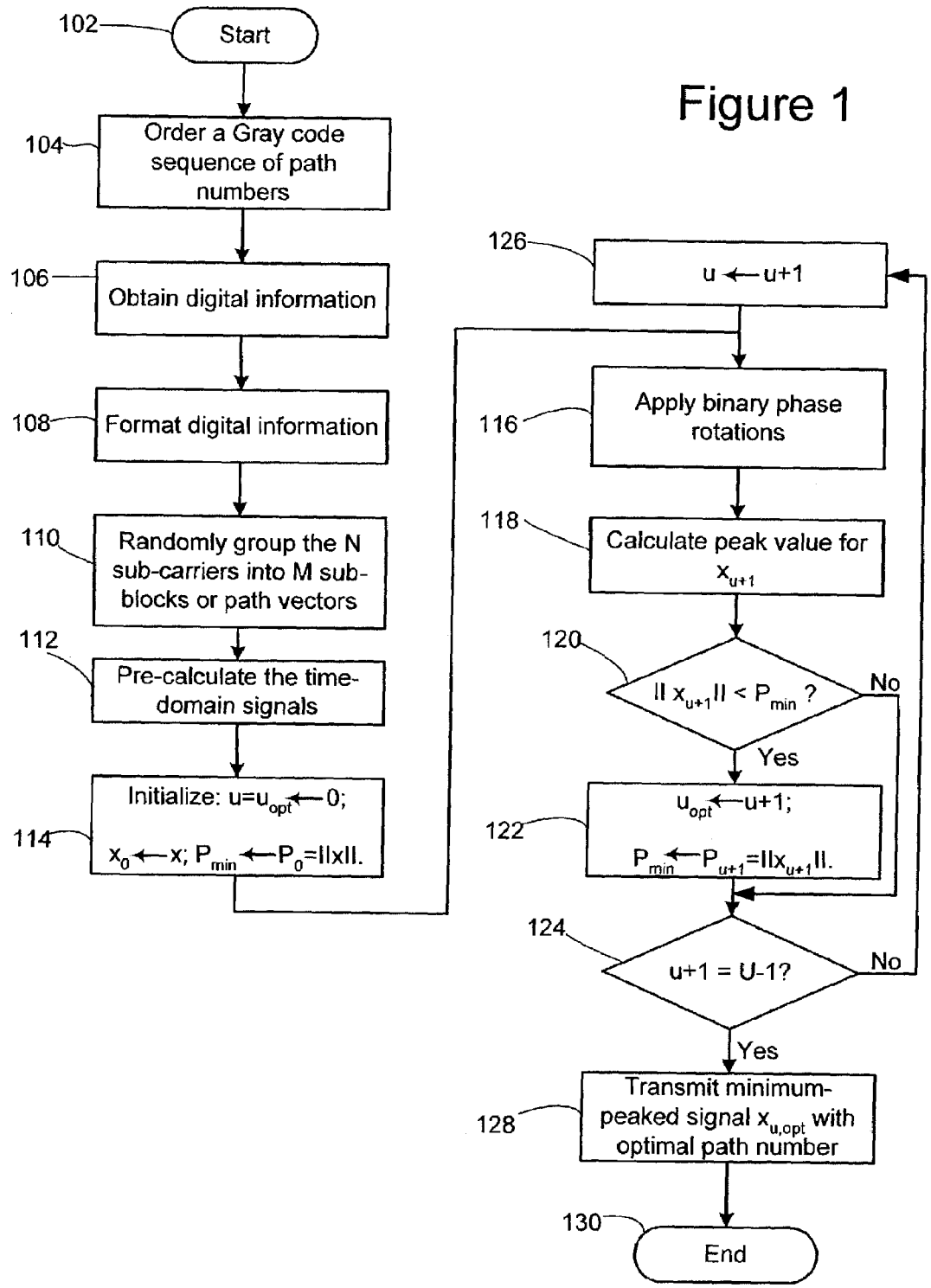
FIG. 1 is a flow chart illustrating the method for reducing peak-to-average power ratio (PAPR) in a multi-carrier communication system in accordance with the present invention.

Referring to FIG. 1, there is shown a flow chart illustrating an exemplary embodiment for reducing peak-to-average power ratio (PAPR) in a multi-carrier communication system in accordance with the present invention.

The process starts at step 102.

At step 104, a sequence of M-bit binary path numbers are ordered using a Gray code, where M is an integer. For all M-bit binary numbers, a sequence of $U=2^M$ numbers may be established, in which the (u+1)th path number is different from the u-th path number by only one digit, wherein u=0, 1, ..., U−1 is an index number. A function g(u) (i.e. g(u)=0, 1, ..., M−1) records the bit position of this one digit, and a function s(u) records the type of change at this one digit in the following manner:

$$s(u) \equiv \begin{cases} -1, & \text{if } g(u)-th \text{ bit is } 1 \\ 1, & \text{if } g(u)-th \text{ bit is } 0 \end{cases}$$

At step 106, digital information to be transmitted is obtained. The digital information may include audio, video, text or data that need to be communicated to other parts of a multi-carrier communication system.

At step 108, the digital information is formatted in accordance with subsequent signal processing needs. For example, serial-to-parallel conversion and channel coding may be performed on the input signal where necessary. For illustrative purposes, assume the input signal is formatted into a vector of size N, which may be represented as:

$$X = [X_1 X_2 \ldots X_N]$$

which corresponds to the constellation points of an OFDM symbol with N sub-carriers. According to an embodiment of the invention, the input signal may be an OFDM signal with 1024 sub-carriers and QPSK modulation, though the method applies to other modulation formats, such as mPSK, QAM, etc., as well as to OFDM signals with different numbers of sub-carriers.

At step 110, the N sub-carriers are randomly grouped into M sub-blocks or path vectors. According to embodiments of the present invention, the M path vectors may be of the same size. The M path vectors may be represented as $V_m$ (wherein m=0, 1, ..., M−1), wherein $V_m = [V_{m,1} V_{m,2} \ldots V_{m,N}]$, $V_{m,i} = X_i p_m(i)$ (wherein i=1, 2, ..., N), and $p_m(i)$ represents position vectors for storing positions of sub-carriers in each sub-block, which may be expressed as:

$$p_m(i) = \begin{cases} 1 \\ 0 \end{cases}$$

if i-th sub-carrier belongs to the m-th path vector otherwise (m=0, 1, ..., M−1).

Therefore, the input vector X may be properly represented as $$X = \sum_{m=0}^{M-1} V_m.$$

Next, at step 112, the time-domain representations of the input vector X and the path vectors $V_m$ (wherein m=0, 1, ..., M−1) are pre-calculated. According to an embodiment of the invention, the time-domain representations of these vectors may be calculated through inverse discrete Fourier transforms (IDFTs). As a result, x=IDFT{X} and $v_m$=IDFT{$V_m$} represent the time-domain signals of vectors X and $V_m$ (wherein m=0, 1, ..., M−1) respectively.

The purpose of ordering a Gray code sequence of M-bit binary path numbers at step 104 is to facilitate a subsequent iteration process to apply all the possible combinations of binary phase rotations to the M path vectors. For each possible combination of binary phase rotations applied, there is a corresponding M-bit binary path number. For example, assume the binary phase rotations may have phase angles $\phi_0$ and $\phi_1$. If, in one combination, phase rotation of angle $\phi_0$ is applied to the m-th path vector (m=0, 1, ..., M−1), that may result in the m-th bit of the corresponding path number being zero ("0"). On the other hand, if phase rotation of angle $\phi_1$ is applied to the m-th path vector (m=0, 1, ..., M−1), that may result in the m-th bit of the corresponding path number being one ("1"). Therefore, the Gray code sequence of path numbers identifies a Gray code sequence of combinations of binary phase rotations that may be applied to the path vectors. For the u-th path number, applying its corresponding combination of binary phase rotations to the path vectors of the input vector X will result in a modulated time-domain signal $x_u$.

At step 114, initial values of index number u and corresponding signal $x_u$ are assigned. According to one embodiment of the invention, an initial value of u may set to be zero and $x_0$ may be assigned the value of time-domain signal x of input vector X. In addition, a variable $p_{min}$ for storing the minimum peak value is also initialized with the peak value of $$x_0, \text{ i.e. } P_{min} = \|x_0\|.$$

The variable $u_{opt}$ for storing the path number that corresponds to the minimum peak value is initialized with zero.

At step 116, the combination of binary phase rotations that corresponds to the next index number u+1 is applied to x, and $x_{u+1}$ is calculated. In one embodiment of the present invention, phase angles $\phi_0$ and $\phi_1$ are chosen to be zero and π, respectively. As a result, the application of zero or π phase rotations to the frequency-domain path vector leads to its time-domain signal to be either added or subtracted from the previously calculated $x_u$. In that case, $x_{u+1} = x_u + 2v_{g(u)}s(u)$.

At step 118, the peak value for signal $x_{u+1}$ is calculated. For illustration purposes, assume the peak value for signal $x_{u+1}$ is $P_{u+1} = \|x_{u+1}\|$.

At step 120, the peak value for signal $x_{u+1}$ (i.e., $P_{u+1}$) is compared with the current minimum peak value $P_{min}$. If $P_{u+1}$ is smaller than $P_{min}$, then the modulated signal $x_{u+1}$ has the smallest peak value. Thus, at step 122, u+1 is assigned to the variable $u_{opt}$ and $P_{u+1}$ is assigned to the variable $P_{min}$. The process then branches to step 124. If, on the other hand, $P_{u+1}$ is not smaller than $P_{min}$, the process branches directly to step 124.

At step 124, it is determined whether the iteration process has reached the end of the Gray code sequence, i.e. u+1=U−1. If this is not yet the last in the sequence, the process will go to step 126, where index number u is incremented by one, and then loop back to step 116. If the last path number in the Gray code sequence is reached, the process will move forward to step 128.

At step 128, the optimal path number that corresponds to the minimum peak value is identified with variable $u_{opt}$. The modulated signal $x_{u,opt}$, which is obtained by applying the optimal combination of binary phase rotations, may now be transmitted to other parts of the multi-carrier communication system, together with the optimal path number.

The process ends at step 130.

It should be noted that, although FIG. 1 illustrates an embodiment of the invention where a global minimum of the peak value is sought, the search following the Gray code sequence may also be conducted to find a sub-optimal result. For example, according to one embodiment of the invention, a preset threshold of peak value may be used. In that case, as soon as a combination of binary phase rotations is found to have modulated the time-domain peak of the input signal vector to a value below the preset threshold, the search process is terminated.

According to embodiments of the present invention, this method for PAPR reduction may be implemented in a variety of program languages. According to an embodiment of the invention, the algorithm may be implemented in fixed-point C or assembly language. This method is typically applied to the transmitter side of a multi-carrier communication system. An exemplary hardware arrangement is described in detail as follows.

Figure 2:
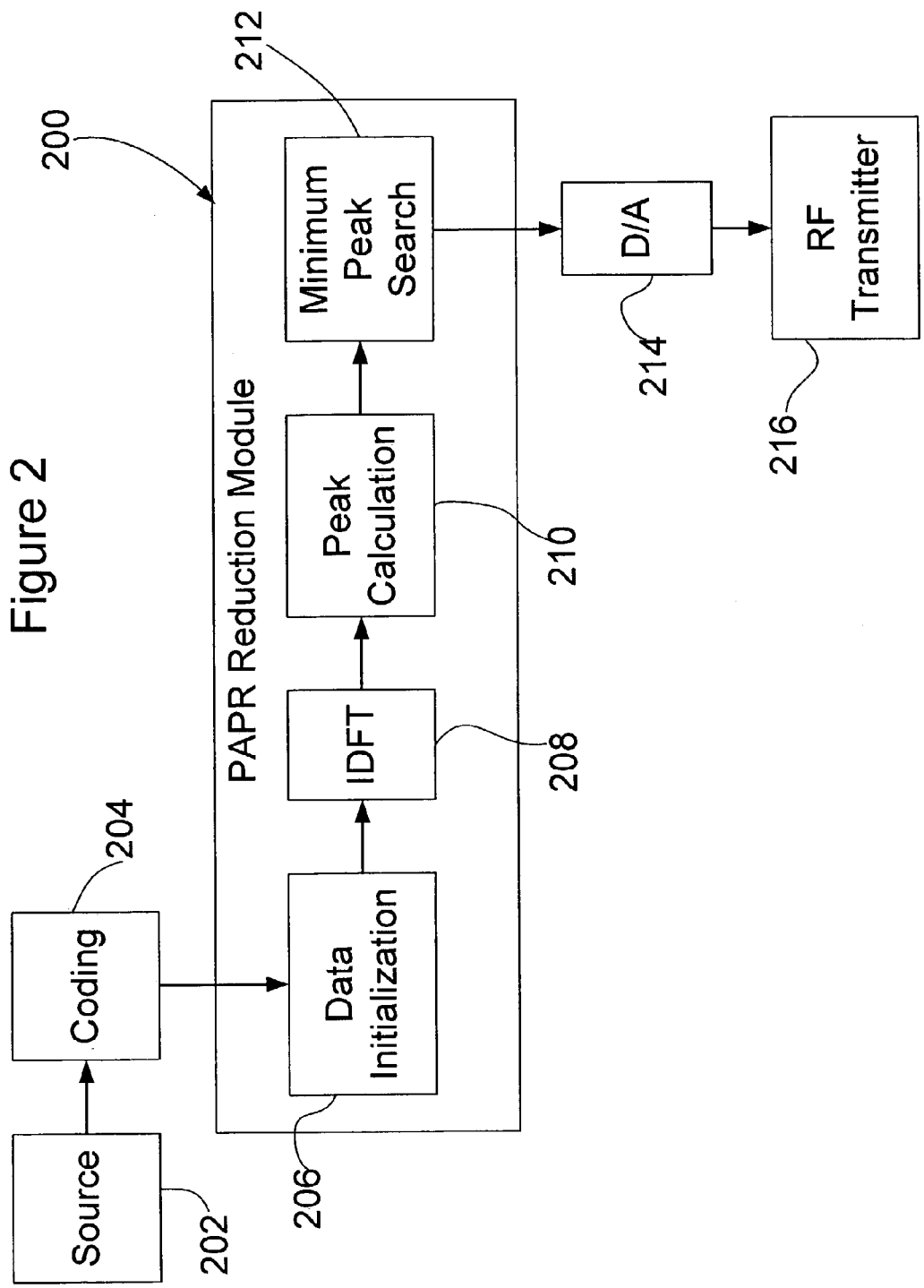
FIG. 2 is a block diagram illustrating a system for reducing peak-to-average power ratio (PAPR) in a multi-carrier communication system in accordance with the present invention.

Referring to FIG. 2, there is shown a block diagram illustrating a system for reducing peak-to-average power ratio (PAPR) in a multi-carrier communication system in accordance with the present invention.

Source 202 is a signal source from which the digital information to be transmitted is obtained. Block 204 is a coding module that performs necessary serial-to-parallel conversion and channel coding on the digital information.

A PAPR reduction module 200 that carries out the Gray encoded PTS algorithm of the present invention. According to embodiments of the invention, the PAPR reduction module 200 may be implemented with at least one general computer processor, programmable digital signal processing (DSP) unit, or custom processor chip. The steps of data initialization, inverse discrete Fourier transform (IDFT), peak calculation and minimum peak search, as described above, may be carried out by modules 206, 208, 210 and 212, respectively, inside the PAPR reduction module 200. Or, alternatively, these steps may be carried out by a single central processing unit (CPU). According to one embodiment of the invention, the algorithm may be implemented on a Texas Instruments™ (TI) TMS320C6416 500 MHz DSP platform. Other system configuration may also exist depending on the desired use and practical performance requirements.

After the minimum peak is found, the optimal path number and the accordingly modulated signal vector are passed on to a digital-to-analog converter (D/A) 214, where digital signals are converted into analog signals suitable for transmission by an RF transmitter 216.

At this point it should be noted that system and method in accordance with the present invention as described above typically involves the processing of input data and the generation of output data to some extent. This input data processing and output data generation may be implemented in hardware or software. For example, specific electronic components may be employed in a digital signal processing unit or similar or related circuitry for implementing the functions associated with PAPR reduction in accordance with the present invention as described above. Alternatively, one or more processors operating in accordance with stored instructions may implement the functions associated with PAPR reduction in accordance with the present invention as described above. If such is the case, it is within the scope of the present invention that such instructions may be stored on one or more processor readable carriers (e.g., a magnetic disk), or transmitted to one or more processors via one or more signals.

The present invention is not to be limited in scope by the specific embodiments described herein. Indeed, other various embodiments of and modifications to the present invention, in addition to those described herein, will be apparent to those of ordinary skill in the art from the foregoing description and accompanying drawings. Thus, such other embodiments and modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for reducing peak-to-average power ratio in digital signal communications, the method comprising the steps of:

modulating a frequency-domain input vector comprising a plurality of path vectors by applying a Gray code sequence of combinations of binary phase rotations to the plurality of path vectors, where, in each combination, the binary phase rotation of only one of the plurality of path vectors is changed from a previous combination in the Gray code sequence; and determining an optimal time-domain peak value based on the modulated frequency-domain input vector;

wherein the frequency-domain input vector is X and the plurality of path vectors are $V_m$, where m=0, 1, ..., M−1 and M is an integer, such that $$X = \sum_{m=0}^{M-1} V_m;$$

wherein the steps of modulating a frequency-domain input vector and determining an optimal time-domain peak value further comprise the steps of:

calculating a time-domain equivalent x of the frequency-domain input vector X;

calculating a time-domain equivalent $v_m$ of the plurality of path vectors $V_m$;

establishing a sequence of time-domain vectors $x_u$, where $u=0, 1, \ldots, U-1$ and U represents distinct path numbers of the Gray code sequence such that $U=2^M$;

calculating a peak value for each of the sequence of time-domain vectors $x_u$; and determining an index number for a time-domain vector that has an optimal time-domain peak value among the sequence of time-domain vectors $x_u$, and a corresponding path number.

2. The method according to claim 1, wherein the frequency-domain input vector corresponds to constellation points of an orthogonal frequency-division multiplexed (OFDM) symbol.

3. The method according to claim 1, wherein the step of determining an optimal time-domain peak value for the modulated frequency-domain input vectors comprises a step of calculating an inverse discrete Fourier transform (IDFT) of the modulated frequency-domain input vector.

4. The method according to claim 1, wherein the optimal time-domain peak value is a minimum peak value of the modulated frequency-domain input vector.

5. The method according to claim 1, further comprising the step of:

identifying an optimal combination of binary phase rotations that corresponds to the optimal time-domain peak value.

6. The method according to claim 5, further comprising the step of:

transmitting information of the optimal combination of binary phase rotations that corresponds to the optimal time-domain peak value.

7. The method according to claim 1, wherein the binary phase rotations consist of phase angles 0 and $\pi$.

8. The method according to claim 1, further comprising the steps of:

ordering the Gray Code sequence of $U=2^M$ distinct path numbers, wherein each of the path numbers is an M-bit binary number and is different from adjacent path numbers in the Gray Code sequence by only one bit;

utilizing a function g(u) to record bit positions in which a (u+1)-th path number is different from a u-th path number in the Gray Code sequence, wherein $u=0, 1, \ldots, U-1$ is an index number and g(u) has an integer value between 0 and M−1 inclusive; and utilizing a function s(u) to record types of changes at the bit positions of the function g(u), wherein $$s(u) \equiv \begin{cases} -1, & \text{if the bit in the recorded } g(u) \text{ bit position is a 1} \\ 1, & \text{if the bit in the recorded } g(u) \text{ bit position is a 0} \end{cases}.$$

9. The method according to claim 8, wherein the steps of modulating a frequency-domain input vector and determining an optimal time-domain peak value further comprise the steps of:

establishing a sequence of time-domain vectors $x_u$, where $x_0=x$ and $x_{u+1}=x_u+2v_{g(u)}s(u)$.

10. At least one processor readable medium storing a computer program of instructions configured to be readable by at least one processor for instructing the at least one processor to execute a computer process for performing the method as recited in claim 1.

11. A method for reducing peak-to-average power ratio in digital signal communications, the method comprising the steps of:

ordering a Cray Code sequence of $U=2^M$ distinct path numbers, wherein each of the path numbers is an M-bit binary number and is different from adjacent path numbers in the Gray Code sequence by only one bit;

utilizing a function g(u) to record bit positions in which a (u+1)-th path number is different from a u-th path number in the Gray Code sequence, wherein $u=0, 1, \ldots, U-1$ is an index number and g(u) has an integer value between 0 and M−1 inclusive; and utilizing a function s(u) to record types of changes at recorded bit positions of the function g(u), wherein $$s(u) \equiv \begin{cases} -1, & \text{if the bit in the recorded } g(u) \text{ bit position is a 1} \\ 1, & \text{if the bit in the recorded } g(u) \text{ bit position is a 0} \end{cases};$$

modulating a frequency-domain input vector comprising a plurality of path vectors by applying a Gray code sequence of combinations of binary phase rotations identified by the Gray Code sequence of distinct path numbers to the plurality of path vectors, where, in each combination, the binary phase rotation of only one of the plurality of path vectors is changed from a previous combination in the Gray code sequence of combinations of binary phase rotations; and determining an optimal time-domain peak value based on the modulated frequency-domain input vector.

12. A method for reducing peak-to-average power ratio in digital signal communications, the method comprising the steps of:

ordering a Gray Code sequence of $U=2^M$ distinct path numbers, wherein each of the path numbers is an M-bit binary number and is different from adjacent path numbers in the Gray Code sequence by only one bit;

utilizing a function g(u) to record bit positions in which a (u+1)-th path number is different from a u-th path number in the Gray Code sequence, wherein $u=0, 1, \ldots, U-1$ is an index number and g(u) has an integer value between 0 and M−1 inclusive; and utilizing a function s(u) to record types of changes at recorded bit positions of the function g(u), wherein $$s(u) \equiv \begin{cases} -1, & \text{if the bit in the recorded } g(u) \text{ bit position is a 1} \\ 1, & \text{if the bit in the recorded } g(u) \text{ bit position is a 0} \end{cases};$$

modulating a frequency-domain input vector comprising a plurality of path vectors by applying a Gray code sequence of combinations of binary phase rotations identified by the Gray Code sequence of distinct path numbers to the plurality of path vectors, where, in each combination, the binary phase rotation of only one of the plurality of path vectors is changed from a previous combination in the Gray code sequence of combinations of binary phase rotations; and determining an optimal time-domain peak value based on the modulated frequency-domain input vector;

wherein the frequency-domain input vector is X and the plurality of path vectors are $V_m$, where $m=0, 1, \ldots, M-1$ and M is an integer, such that $$X = \sum_{m=0}^{M-1} V_m;$$

wherein the steps of modulating a frequency-domain input vector and determining an optimal time-domain peak value further comprise the steps of:

calculating a time-domain equivalent x of the frequency-domain input vector X;

calculating a time-domain equivalent $v_m$ of the plurality of path vectors $V_m$;

establishing a sequence of time-domain vectors $x_u$, where $x_0=x$ and $x_{u+1}=x_u+2v_{g(u)}s(u)$;

calculating a peak value for each of the sequence of time-domain vectors $x_u$; and determining an index number for a time-domain vector that has the optimal time-domain peak value among the sequence of time-domain vectors $x_u$, and a corresponding path number.

* * * * *